US011888195B2

(12) United States Patent
Shirakawa et al.

(10) Patent No.: US 11,888,195 B2
(45) Date of Patent: Jan. 30, 2024

(54) FUEL CELL POWER GENERATION SYSTEM

(71) Applicant: HITACHI, LTD., Tokyo (JP)

(72) Inventors: Yuzo Shirakawa, Tokyo (JP); Takao Ishikawa, Tokyo (JP)

(73) Assignee: HITACHI, LTD., Tokyo (JP)

( * ) Notice: Subject to any disclaimer, the term of this patent is extended or adjusted under 35 U.S.C. 154(b) by 15 days.

(21) Appl. No.: 17/639,771

(22) PCT Filed: Mar. 26, 2020

(86) PCT No.: PCT/JP2020/013742
§ 371 (c)(1),
(2) Date: Mar. 2, 2022

(87) PCT Pub. No.: WO2021/192163
PCT Pub. Date: Sep. 30, 2021

(65) Prior Publication Data
US 2022/0336833 A1    Oct. 20, 2022

(51) Int. Cl.
*H01M 8/0612*    (2016.01)
*H01M 8/04014*    (2016.01)

(52) U.S. Cl.
CPC ..... *H01M 8/0618* (2013.01); *H01M 8/04022* (2013.01)

(58) Field of Classification Search
CPC .......................... H01M 8/0618; H01M 8/04022
See application file for complete search history.

(56) References Cited

U.S. PATENT DOCUMENTS

| 5,134,043 A | 7/1992 | Nakazawa |
| 2004/0229092 A1* | 11/2004 | Take ................. H01M 8/04089 |
| | | 429/513 |

(Continued)

FOREIGN PATENT DOCUMENTS

| JP | 03-238765 A | 10/1991 |
| JP | 2000-268832 A | 9/2000 |

(Continued)

OTHER PUBLICATIONS

International Search Report of PCT/JP2020/013742 dated Jun. 2, 2020.

(Continued)

*Primary Examiner* — Matthew J Merkling
(74) *Attorney, Agent, or Firm* — MATTINGLY & MALUR, PC

(57) ABSTRACT

An object of the present invention is to provide a fuel cell power generation system that can attain a higher fuel utilization rate and can also attain higher power generation efficiency simultaneously. The fuel cell power generation system includes an oxide-ion-conducting first fuel cell 11 that performs reformation of a fuel containing hydrocarbon and power generation and a proton-conducting second fuel cell 12 that performs power generation by being supplied with hydrogen from the first fuel cell 11. The fuel utilization rate of the first fuel cell 11 can be set to 30% or lower, for example, and the fuel utilization rate of the second fuel cell 12 can be set to 70% or higher, for example. By adopting such a multi-stage configuration, it is possible to increase the power generation efficiency as a whole and to also attain a high fuel utilization rate simultaneously.

15 Claims, 2 Drawing Sheets

(56) References Cited

U.S. PATENT DOCUMENTS

2005/0271914 A1* 12/2005 Farooque ............ H01M 8/0637
  429/410
2015/0111121 A1* 4/2015 Weingaertner ...... H01M 8/0618
  429/425

FOREIGN PATENT DOCUMENTS

| JP | 2006-031989 A | 2/2006 |
| JP | 2007-164989 A | 6/2007 |
| JP | 2007-194095 A | 8/2007 |
| JP | 2009-048854 A | 3/2009 |
| JP | 2011-181489 A | 9/2011 |
| JP | 2012-150988 A | 8/2012 |
| JP | 2015-015100 A | 1/2015 |
| JP | 2016-115479 A | 6/2016 |
| JP | 2017-183033 A | 10/2017 |
| JP | 2019-196286 A | 11/2019 |

OTHER PUBLICATIONS

Japanese Office Action received in corresponding Japanese Application No. 2022-510275 dated Sep. 6, 2022.

* cited by examiner

FUEL CELL POWER GENERATION SYSTEM

TECHNICAL FIELD

The present invention relates to a fuel cell power generation system.

BACKGROUND ART

As fuel cells that perform power generation by causing chemical reactions between hydrocarbon and oxygen of biofuels and the like, there are known fuel cell power generation systems that use solid oxide fuel cells (Solid Oxide Fuel Cells; referred to as "SOFCs" below). Such fuel cell power generation systems are already at the practical use stage, and further have entered the popularization stage. For the purpose of attaining higher efficiency, various improvements have been attempted for the SOFCs. An SOFC typically has a three-layer structure of fuel electrode/ electrolyte membrane/air electrode in which an electrolyte membrane including ceramics or the like is sandwiched between a fuel electrode and an air electrode.

As one widely known form of SOFCs, oxide-ion-conducting SOFCs are known. An oxide-ion-conducting SOFC uses an oxide-ion-conducting solid electrolyte as an electrolyte, and performs power generation by using a power generation reaction that is caused by supplying a fuel gas to a fuel electrode and supplying, as an oxidant gas, air or oxygen to an air electrode. Oxide-ion-conducting SOFCs have drawbacks such as high costs because such SOFCs operate at temperatures as high as approximately 600 to 800° C., for example, and materials that can be used are thus limited. Because of this, development of SOFCs that can operate at a lower medium-temperature area (equal to or lower than 600° C.) is underway.

In addition, fuel cell power generation systems are also required to attain higher thermal efficiency while they are required to attain high fuel utilization rates. However, it has been difficult with currently popular oxide-ion-conducting SOFCs to pursue both a high fuel utilization rate and high thermal efficiency.

On the other hand, proton-conducting fuel cells (PCFCs: Proton-conducting Ceramic-electrolyte Fuel Cells) adopting, as a solid electrolyte, a proton-conducting solid oxide that uses protons (H+ (hydrogen ions)) as conducting ions are also attracting attention as next-generation fuel cells. However, the PCFCs are not sufficient in terms of thermal efficiency as compared to the oxide-ion-conducting SOFCs.

PRIOR ART DOCUMENT

Patent Document

Patent Document 1: JP-2000-268832-A
Patent Document 2: JP-2012-150988-A
Patent Document 3: JP-2007-164989-A

SUMMARY OF THE INVENTION

Problem to be Solved by the Invention

An object of the present invention is to provide a fuel cell power generation system that can attain a higher fuel utilization rate and can also attain higher power generation efficiency simultaneously.

Means for Solving the Problem

In order to solve the problem described above, a fuel cell power generation system according to the present invention includes an oxide-ion-conducting first fuel cell that performs reformation of a fuel containing hydrocarbon and power generation, and a proton-conducting second fuel cell that performs power generation by being supplied with hydrogen from the first fuel cell.

Advantage of the Invention

According to the present invention, it is possible to provide a fuel cell power generation system that can attain a higher fuel utilization rate and can also attain higher power generation efficiency simultaneously.

MODES FOR CARRYING OUT THE INVENTION

The present embodiments are explained below with reference to the attached drawings. In the attached drawings, functionally the same elements are denoted with the same numbers in some cases. Note that whereas the attached drawings depict embodiments and implementation examples according to the principles of the present disclosure, these are for understanding of the present disclosure, and should in no way be used for interpreting the present disclosure in a limited manner. The description of the present specification is merely an illustration of typical examples, and does not limit claims or application examples of the present disclosure in any sense.

Whereas explanations of the present embodiments are given sufficiently in detail such that those skilled in the art can implement the present disclosure, it needs to be understood that other implementation/modes are also possible, and that configurational/structural changes and replacement of various elements are possible without deviating from the scope and spirit of the technical idea of the present disclosure. Accordingly, the following descriptions should not be interpreted in a limited manner.

First Embodiment

Figure 1:
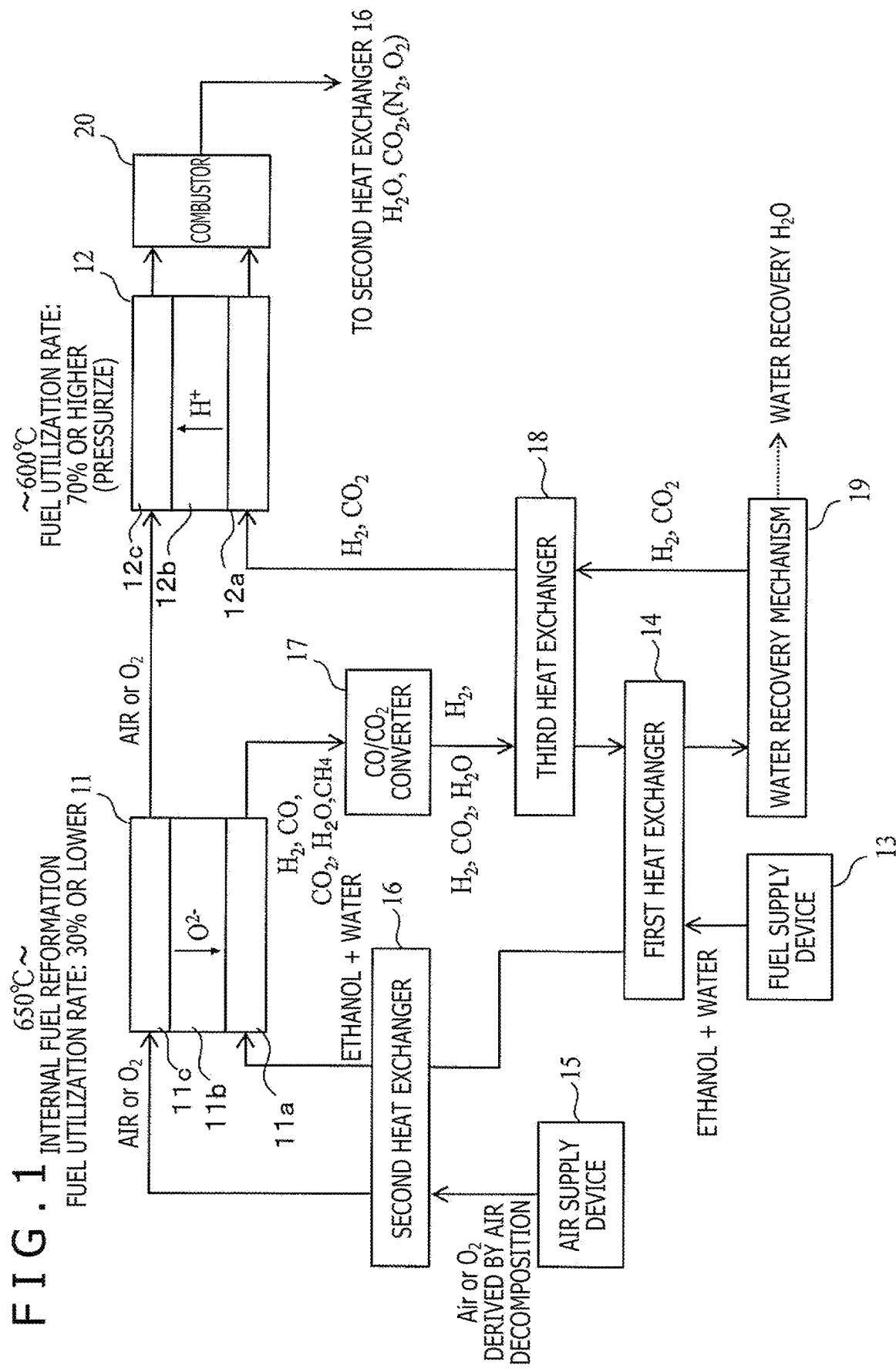
FIG. 1 is a block diagram depicting the overall configuration of a fuel cell power generation system according to a first embodiment.

The overall configuration of a fuel cell power generation system according to a first embodiment is explained with reference to a block diagram in FIG. 1. The fuel cell power generation system includes a first fuel cell 11 and a second fuel cell 12 positioned downstream of the first fuel cell 11. Note that, although not depicted in the drawing, both the first fuel cell 11 and the second fuel cell 12 can be configured as SOFC stacks each including a plurality of cells that are stacked one on another via interconnectors.

The first fuel cell 11 is an oxide-ion-conducting fuel cell. For example, the first fuel cell 11 includes a fuel electrode 11a, an electrolyte membrane 11b, and an air electrode 11c. For example, the fuel electrode 11a includes a porous body formed by using a mixture of nickel (Ni), yttria stabilized zirconia (YSZ), or the like as a material. In addition, for example, the air electrode 11c includes a porous body of Sr-doped $LaFeO_3$, $LaMnO_3$, or the like. For example, the electrolyte membrane 11b can include a sintered body formed by using yttria stabilized zirconia (YSZ) as a material. What is described above is an example, and the materials of the fuel electrode 11a, the electrolyte membrane 11b, and the air electrode 11c are not limited to these. In addition, any of a flat plate method, a cylindrical method, and an integrated stacking method may be used for the fuel electrode 11a, the electrolyte membrane 11b, and the air electrode 11c.

On the other hand, the second fuel cell 12 is a proton-conducting fuel cell. For example, the second fuel cell 12 includes a fuel electrode 12a, an electrolyte membrane 12b, and an air electrode 12c. Materials of the fuel electrode 12a and the air electrode 12c may be similar to the materials of the fuel electrode 11a and the air electrode 11c. Unlike the oxide-ion-conducting fuel cell, a $BaZrCeO_3$-based or $BaZrO_3$-based material, for example, can be used for the electrolyte membrane 12b. Similarly, what is described above is an example, and the materials of the fuel electrode 12a, the electrolyte membrane 12b, and the air electrode 12c are not limited to these.

In the fuel cell power generation system according to this embodiment, the oxide-ion-conducting first fuel cell 11 and the proton-conducting second fuel cell 12 are arrayed (in series) at a plurality of stages in the one system, and further, the former is arrayed upstream (on the upstream) of the latter. Merits of such an array are what the present inventors found out on the basis of characteristics of both the fuel cells. These points are mentioned later.

The first fuel cell 11 can be controlled to operate at a high temperature as compared to the second fuel cell 12. For example, the first fuel cell 11 can be operated at a temperature equal to or higher than 650° C., and the second fuel cell 12 can be operated at a temperature equal to or lower than 600° C. In addition, the fuel utilization rate of the first fuel cell 11 can be set to a low value as compared to the fuel utilization rate of the second fuel cell 12. For example, the fuel utilization rate of the former can be set to 30% or lower, and, on the other hand, the fuel utilization rate of the latter can be set to 70% or higher. By setting the fuel utilization rates as described above, a high fuel utilization rate can be achieved as the whole system, and also the power generation efficiency can be enhanced simultaneously.

The fuel cell power generation system in this embodiment further includes a fuel supply device 13, a first heat exchanger 14, an air supply device 15, a second heat exchanger 16, a $CO/CO_2$ converter 17, a third heat exchanger 18, a water recovery mechanism 19, and a combustor 20.

The fuel supply device 13 supplies a mixed solution of water and a hydrocarbon fuel (e.g. ethanol) as a fuel of the present system. As the fuel, low-concentration hydrated ethanol (ethanol concentration: 46 wt % or lower, suitably 20 wt % or lower) that can simplify a distillation step at the time of bioethanol production can be adopted, but this is not the sole example.

The first heat exchanger 14 performs heat exchange between the supply from the fuel supply device 13 and a supply from the third heat exchanger 18 mentioned later. The fuel heated at the first heat exchanger 14 is heated further at the second heat exchanger 16. The second heat exchanger 16 is configured to perform heat exchange between gas generated at the combustor 20 and the fuel emitted from the first heat exchanger 14.

Air (or oxygen) and the fuel that is heated and vaporized at the second heat exchanger 16 (ethanol+water) are supplied to the fuel electrode 11a and air electrode 11c of the first fuel cell 11, respectively. Oxygen in the air becomes oxygen ions at the air electrode 11c, passes through the electrolyte membrane 11b, and reaches the fuel electrode 11a. The oxygen ions release electrons by reacting with the fuel supplied to the fuel electrode 11a, and generates water ($H_2O$) and carbon dioxide ($CO_2$) as reaction products.

At the fuel electrode 11a of the first fuel cell 11, the fuel generates hydrogen ($H_2$) and carbon monoxide (CO) due to catalysis of nickel or the like. Hydrogen and carbon monoxide become a fuel at the first fuel cell 11. Hydrogen ($H_2$) and carbon monoxide (CO) that have not been the target of combustion are released from the first fuel cell 11. In this manner, water ($H_2O$) and carbon dioxide ($CO_2$), which are reaction products, and hydrogen ($H_2$) and carbon monoxide (CO), which are unreacted fuels, are released as an anode off-gas from the fuel electrode 11a of the first fuel cell 11.

In addition, residual air (or oxygen) which has been supplied to the air electrode 11c but has not been used for combustion is emitted from the air electrode 11c as a cathode off-gas. The emitted air is supplied to the air electrode 12c of the second fuel cell 12 through an air pipe.

The $CO/CO_2$ converter 17 is a device that causes carbon monoxide (CO) contained in the anode off-gas to react with water vapor ($H_2O$) and converts carbon monoxide (CO) into carbon dioxide ($CO_2$) and hydrogen ($H_2$). As a result, it is possible to increase the content of hydrogen in the anode off-gas and supply a larger amount of hydrogen to the second fuel cell 12.

The third heat exchanger 18 is a device that performs heat exchange between gas (water vapor ($H_2O$), carbon dioxide ($CO_2$), and hydrogen ($H_2$)) emitted from the $CO/CO_2$ converter 17 and gas output from the water recovery mechanism 19. As a result, an emitted gas 17 from the $CO/CO_2$ converter 17 is cooled to a predetermined temperature.

In addition, the emitted gas ($H_2$, $CO_2$ and $H_2O$) from the first fuel cell 11 cooled at the third heat exchanger 18 is further cooled by heat exchange at the first heat exchanger 14 with a fuel (a mixed solution of ethanol and water) supplied from the fuel supply device 13. The emitted gas is cooled to approximately 40 degrees or lower, for example, is condensed, and becomes condensed water. Thereafter, the condensed water is supplied to the water recovery mechanism 19, and moisture content is removed and recovered therefrom.

The gas ($H_2$ and $CO_2$) from which the moisture content has been removed at the water recovery mechanism 19 is heated at the third heat exchanger 18, and then supplied to the fuel electrode 12a of the second fuel cell 12 as a fuel. Hydrogen supplied to the fuel electrode 12a turns into hydrogen ions, passes through the electrolyte membrane 11b, reaches the air electrode 12c, reacts with oxygen ions, and releases electrons. The fuel utilization rate of the second fuel cell 12 is set to a large value which is equal to or higher than 70%, for example, and a large portion of supplied hydrogen becomes the target of combustion. However, residual hydrogen is emitted from the fuel electrode 12a and reaches the combustor 20. The combustor 20 combusts the residual hydrogen and emits water ($H_2O$) along with other gas ($CO_2$, $N_2$, and $O_2$) and the like. This emitted gas is provided for heat exchange at the second heat exchanger 16 as mentioned before.

As mentioned above, in the configuration adopted in the fuel cell power generation system in the present embodiment, the oxide-ion-conducting first fuel cell 11 and the proton-conducting second fuel cell 12 are used in combination, and also the first fuel cell 11 is arranged upstream of the second fuel cell 12. The technical significance of such a configuration is explained below.

The power generation efficiency of the oxide-ion-conducting fuel cell tends to lower as the fuel utilization rate increases. On the other hand, the power generation efficiency of the proton-conducting fuel ionization does not change almost at all regardless of the level of the fuel utilization rate. The present inventors found out that, by adopting a multi-stage connection in which the oxide-ion-conducting fuel cell is placed on the upstream side and the proton-conducting fuel cell is placed on the downstream side, the power generation efficiency can be enhanced as a whole; moreover, the fuel utilization rate can also be enhanced. According to this configuration, the fuel utilization rate of the upstream oxide-ion-conducting first fuel cell 11 is intentionally not increased, but the power generation efficiency is enhanced. By setting the fuel utilization rate low, a large amount of hydrogen is emitted from the first fuel cell 11, but the hydrogen is used as a fuel at the downstream second fuel cell 12. Because the second fuel cell 12 is a proton-conducting fuel cell, the power generation efficiency does not change significantly even if the fuel utilization rate is set high. In this manner, according to the configuration of the present embodiment, it is possible to pursue both a high fuel utilization rate and high power generation efficiency as a whole.

Second Embodiment

Figure 2:
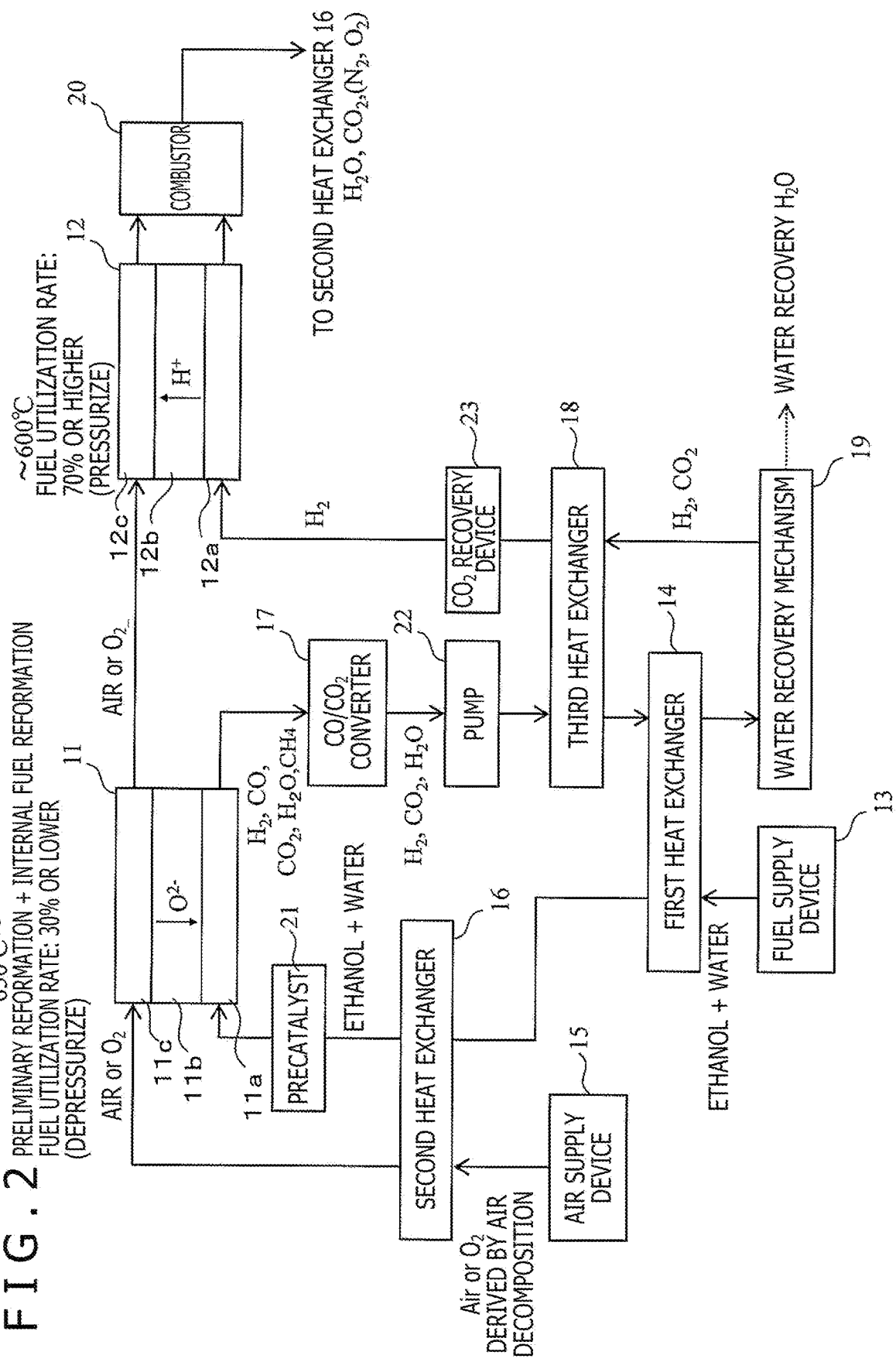
FIG. 2 is a block diagram depicting the overall configuration of the fuel cell power generation system according to a second embodiment.

Next, the overall configuration of the fuel cell power generation system according to a second embodiment is explained with reference to a block diagram in FIG. 2. The system according to the second embodiment is different from the system according to the first embodiment in that the system further has a precatalyst 21, a pump 22, and a $CO_2$ recovery device 23 additionally. The other constituent elements are identical, and identical reference characters are given to the other constituent elements in FIG. 2. Explanations of those identical constituent elements are omitted below in order to avoid repetition of the same explanations.

The precatalyst 21 is a catalyst for reforming the fuel heated at the first heat exchanger 14 and the second heat exchanger 16. In a case where the fuel contains hydrocarbon other than methane, carbon is generated in pipes, the fuel electrode 11a, and the like, and this deteriorates the cell performance in some cases. The precatalyst 21 can change such hydrocarbon whose carbon number is two or larger into a reformation gas containing hydrogen, carbon monoxide, and methane. Examples of a reforming catalyst used for the precatalyst 21 include, for example, nickel, platinum, palladium, rhodium, iridium, ruthenium, molybdenum, rhenium, tungsten, vanadium, osmium, chromium, cobalt, iron, niobium, copper, zinc, and the like and a composite catalyst containing a combination of these. In addition, as a support that supports the reforming catalyst, for example, α-alumina, titania, zirconia, oxidized niobium, silica, magnesia, ceria, or the like or a composite support containing a combination of these can be used. For example, the shape of the support can be a pellet shape, a honeycomb shape, a sheet shape, a monolith shape, a granular shape, or the like, as appropriate.

The pump 22 is disposed downstream of the $CO/CO_2$ converter 17, for example, on a fuel line between the first fuel cell 11 and the second fuel cell 12. The pump 22 has a role of operating the fuel line of the first fuel cell 11 under a depressurization condition, and, on the other hand, operating the fuel line of the second fuel cell 12 under a pressurization condition. By operating the second fuel cell 12 under the pressurization condition, the fuel utilization rate of the second fuel cell 12 can be enhanced further.

The $CO_2$ recovery device 23 is a device that recovers/removes carbon dioxide ($CO_2$) from gas emitted from the first fuel cell 11 and emitted from the third heat exchanger 18. By removing carbon dioxide, the fuel utilization rate of the second fuel cell 12 can be enhanced further. Note that a chemisorption method, a physisorption method, a membrane separation method, or the like can be adopted as the recovery method of the $CO_2$ recovery device 23, and the recovery method is not limited to any particular one.

According to the second embodiment, advantages similar to those attained with the system according to the first embodiment can be attained. Further, by adding the precatalyst 21, the pump 22, and the $CO_2$ recovery device 23, it becomes possible to further enhance the fuel utilization rate of the second fuel cell 12.

The present invention is not limited to the embodiments described above, but includes various modification examples. For example, the embodiments described above are explained in detail in order to explain the present invention in an easy-to-understand manner, and are not necessarily limited to ones including all the configurations explained. In addition, some of the configurations of an embodiment can be replaced with configurations of another embodiment, and configurations of an embodiment can also be added to the configurations of another embodiment. In addition, some of the configurations of the embodiments can additionally have other configurations, can be removed, or can be replaced with other configurations.

DESCRIPTION OF REFERENCE CHARACTERS

11: First fuel cell (oxide-ion-conducting)
12: Second fuel cell (proton-conducting)
13: Fuel supply device
14: First heat exchanger
15: Air supply device
16: Second heat exchanger
17: $CO/CO_2$ converter
18: Third heat exchanger
19: Water recovery mechanism
20: Combustor
21: Precatalyst
22: Pump
23: $CO_2$ recovery device

The invention claimed is:

1. A fuel cell power generation system comprising:
    an oxide-ion-conducting first fuel cell that performs reformation of a fuel containing hydrocarbon and power generation; and
    a proton-conducting second fuel cell, coupled to the first fuel cell via an air pipe, that performs power generation by being supplied with hydrogen from the first fuel cell,
    wherein the second fuel cell is connected downstream of the first fuel cell such that hydrogen emitted from the first fuel cell is fuel to the second fuel cell and air emitted from the first fuel cell is supplied to the second fuel cell via the air pipe.

2. The fuel cell power generation system according to claim 1, further comprising:
    a CO/CO2 converter that converts carbon monoxide emitted from the first fuel cell, to carbon dioxide.

3. The fuel cell power generation system according to claim 1, further comprising:

a water recovery mechanism that recovers condensed water condensed by being cooled after being emitted from the first fuel cell.

4. The fuel cell power generation system according to claim 1, wherein a fuel utilization rate of the second fuel cell is higher than a fuel utilization rate of the first fuel cell.

5. The fuel cell power generation system according to claim 4, wherein the fuel utilization rate of the first fuel cell is equal to or lower than 30%, and the fuel utilization rate of the second fuel cell is equal to or higher than 70%.

6. The fuel cell power generation system according to claim 1, wherein the first fuel cell is operated in a first temperature area, and the second fuel cell is operated in a second temperature area in which a temperature is lower than that in the first temperature area.

7. The fuel cell power generation system according to claim 1, further comprising:
- a combustor that combusts a fuel gas with air, the fuel gas and the air being emitted from the second fuel cell;
- a first heat exchanger that performs heat exchange between a fuel supplied to the first fuel cell and a fuel emitted from the first fuel cell;
- a second heat exchanger that performs heat exchange between a fuel heated at the first heat exchanger and gas emitted from the combustor; and
- a third heat exchanger that performs heat exchange between a fuel gas emitted from the first fuel cell and a fuel gas supplied to the second fuel cell.

8. The fuel cell power generation system according to claim 7, further comprising:
- a CO/CO2 converter that converts carbon monoxide emitted from the first fuel cell, to carbon dioxide.

9. The fuel cell power generation system according to claim 7, further comprising:
- a water recovery mechanism that recovers condensed water condensed by being cooled after being emitted from the first fuel cell.

10. The fuel cell power generation system according to claim 7, wherein a fuel utilization rate of the second fuel cell is higher than a fuel utilization rate of the first fuel cell.

11. The fuel cell power generation system according to claim 10, wherein the fuel utilization rate of the first fuel cell is equal to or lower than 30%, and the fuel utilization rate of the second fuel cell is equal to or higher than 70%.

12. The fuel cell power generation system according to claim 1, further comprising:
- a precatalyst for reforming a fuel, the precatalyst being disposed on an upstream side of the first fuel cell.

13. The fuel cell power generation system according to claim 1, further comprising:
- a pump arranged on a fuel line between the first fuel cell and the second fuel cell,
- wherein while a fuel line of the first fuel cell is operated under a depressurization condition, a fuel line of the second fuel cell is operated under a pressurization condition.

14. The fuel cell power generation system according to claim 1, further comprising:
- a CO2 recovery device for recovering carbon dioxide contained in gas emitted from the first fuel cell.

15. A fuel cell power generation system comprising:
an oxide-ion-conducting first fuel cell that performs reformation of a fuel containing hydrocarbon and power generation;
a proton-conducting second fuel cell, coupled to the first fuel cell via an air pipe, that performs power generation by being supplied with hydrogen from the first fuel cell;
a fuel supply device that supplies the fuel;
a combustor that combusts a fuel gas with air, the fuel gas and the air being emitted from the second fuel cell;
a first heat exchanger that performs heat exchange between a fuel supplied to the first fuel cell and a fuel emitted from the first fuel cell;
a second heat exchanger that performs heat exchange between a fuel heated at the first heat exchanger and gas emitted from the combustor;
a third heat exchanger that performs heat exchange between a fuel gas emitted from the first fuel cell and a fuel gas supplied to the second fuel cell;
a CO/CO2 converter that converts carbon monoxide emitted from the first fuel cell, to carbon dioxide; and
a water recovery mechanism that recovers condensed water condensed by being cooled by the second heat exchanger and the third heat exchanger after being emitted from the first fuel cell,
wherein a fuel utilization rate of the second fuel cell is higher than a fuel utilization rate of the first fuel cell,
wherein the first fuel cell is operated in a first temperature area, and the second fuel cell is operated in a second temperature area in which a temperature is lower than that in the first temperature area, and
wherein the second fuel cell is connected downstream of the first fuel cell such that hydrogen emitted from the first fuel cell is fuel to the second fuel cell and air emitted from the first fuel cell is supplied to the second fuel cell via the air pipe.

* * * * *